United States Patent [19]

Seguy et al.

[11] Patent Number: 4,792,652
[45] Date of Patent: Dec. 20, 1988

[54] ELECTRIC INDUCTION COOKING APPLIANCE WITH REDUCED HARMONIC EMISSION

[75] Inventors: Michel Seguy, Avon; Michel Bisson, Nemours, both of France

[73] Assignee: Electricite de France - Service National, paris, France

[21] Appl. No.: 10,615

[22] Filed: Feb. 4, 1987

[30] Foreign Application Priority Data

Dec. 10, 1986 [FR] France ................ 86 17273

[51] Int. Cl.⁴ .................................................. H05B 6/44
[52] U.S. Cl. ........................... 219/10.493; 219/10.75; 219/10.79; 336/232
[58] Field of Search ............... 219/10.49 R, 10.79, 219/10.75, 10.43, 10.67, 10.71, 10.493; 336/232; 99/DIG. 14

[56] References Cited

U.S. PATENT DOCUMENTS

| | | | |
|---|---|---|---|
| 3,275,784 | 9/1966 | Merrett | 219/10.79 |
| 3,704,357 | 11/1972 | Moulin | 219/10.79 |
| 3,786,222 | 1/1974 | Harnden, Jr. et al. | 219/10.49 R |
| 3,906,181 | 9/1975 | Hibino et al. | 219/10.49 R |
| 3,928,744 | 12/1975 | Hibino et al. | 219/10.79 X |
| 3,979,572 | 9/1976 | Ito et al. | 219/10.67 X |
| 3,980,858 | 9/1976 | Hibino | 219/10.49 R |
| 4,092,511 | 5/1978 | Austin | 219/10.49 R |

FOREIGN PATENT DOCUMENTS 2315819 3/1979 France .
2481042 10/1981 France .

Primary Examiner—Philip H. Leung
Attorney, Agent, or Firm—Sughrue, Mion, Zinn, Macpeak, and Seas

[57] ABSTRACT

Electric induction cooking appliance comprising a support for a vessel (C) to be heated and at least one flat inductor intended to be fed by a frequency convertor, characterized in that the inductor consists of a first coil (4) having a first sense and of at least one second coil (5) formed of at least one turn of opposite sense to that of the first coil.

2 Claims, 2 Drawing Sheets

ELECTRIC INDUCTION COOKING APPLIANCE WITH REDUCED HARMONIC EMISSION

The present invention relates to electric heating plates for cooking and is more particularly concerned with induction heated cooking plates.

Heating of cooking vessels by induction is obtained by producing in the vessels a current induced by a varying magnetic field, the passage of the induced current in the object to be heated causing heating of the latter by the Joule effect.

The varying magnetic field is produced by means of a frequency convertor which enables frequencies of 25 to 30 KHz to be obtained from the 50 Hz mains frequency.

Whatever technique is used (transistors or thyristors), the frequency conversion is obtained either by the switched discharge of a capacitor into an inductance, or by the oscillatory discharge of an inductance into a capacitor.

Analysis of the various known frequency convertors shows that the wave-form of the inductor current obtained at the output of such a convertor is very far from that of a sinusoid and that this current can be decomposed as the sum of currents comprising the fundamental component of 20 to 40 KHz and a certain number of harmonics.

The fundamental frequency is chosen so that:
an effective heating of the vessel is obtained
the hearing of persons (or even of domestic animals) is not disturbed
it is not situated in the frequency bands reserved for radio transmissions.

But if in effect in the majority of cases the frequency convertors for this type of application use a radiation between 20 and 40 KHz, therefore not disturbing radio transmissions, the harmonics of 5th and higher orders (of which the frequencies are in the long wave, medium wave and short wave amplitude-modulation radio reception bands) do disturb reception.

These harmonics, modulated in amplitude by the rectifier of the convertor, constitute a non-negligible disturbance for the individual who wishes to heat a vessel at the same time as he listens to the radio. In effect, his radio equipment, tuned to the harmonic, restores for him the modulation of 100 Hz, in the case of monophase rectification, or of 300 Hz in the case of three-phase rectification.

Up to the present, induction cooking appliances were used essentially in the kitchens of communities and have therefore not been the subject of particular studies aimed at limiting the radiation of disturbing harmonics.

At the most, in some cooking appliances of this type, there can be seen the presence of "metallic cages" which also act as supports and which contribute to the reduction of radiation like a Faraday cage.

With the hypothesis that the use of induction cooking appliances might develop to a large extent in the field of private household equipment, the shielding obtained only by means of a metallic cage of the type mentioned does not constitute an acceptable solution.

In the first place, the presence of a shield is insufficient because the shield allows too high a level of disturbance to pass, preventing, for example, listening to an amplitude modulation transistor-radio within a kitchen of the usual dimensions.

In the second place, the cost of a metallic shielding is too high if it is hoped to put on the market induction cooking appliances accessible to all.

In order to reduce the noticeable radiations, it has been proposed to make the inductor current produced by the frequency convertor unobjectionable, for example, by deforming it so as not to generate disturbing harmonics. However, such a solution appears difficult if one considers that the shape of the signal has to be a function in particular of the size and of the material of the vessel to be heated.

Furthermore, the aspect of the pollution of the environment by higher order harmonics alone is insufficient to judge the radiation qualities for this sort of equipment.

In fact, the legislator imposes, or will impose within a more or less short time, limits on the radiation for this type of equipment.

For example, in the FRG, it is stipulated in the document VDE 871 that the limit of radiation to be reached by equipment for the public at large, liable to produce disturbing radiations in the band from 9 KHz to 150 KHz, is 50 uV/m at 30 meters.

If the majority of the equipments tested have harmonics of which the level is well below this limit, it is not the same for the fundamental which varies from 200 uV/m to 1000 uV/m, always at 30 meters.

Therefore, in order that these appliances should have a chance of development in the domestic field, it is necessary that they should respond to two essential criteria as regards radio disturbance:
that the value of the fundamental magnetic field should be less than the limits fixed by the standard or standards (it would appear that the value of 50 uV/m at 30 meters is acceptable at least in Europe:
that the harmonics generated be at such a level that they are no longer perceptible on an amplitude-modulation radio receiver.

In order to arrive at this result, one solution has consisted in ensuring that the field is canalized close to the inductor by means of a ferrite pot.

If the use of a ferrite pot enclosing the inductor associated with a shield enables the standards or the proposals for actual standards to be respected, it is observed that the disturbances caused by the harmonics, nevertheless at a level much lower than the values of the standards, prevent satisfactory reception by radio of amplitude modulation.

Therefore, the invention aims at remedying the disadvantages of the electric cooking plates of the earlier technique by creating a cooking plate which while being of a relatively simple construction, allies a high heating effectiveness to a harmonic level reduced to the minimum.

It therefore has as its subject an electric appliance for cooking by induction comprising a support for a vessel to be heated and at least one flat inductor, intended to be supplied by a frequency convertor, characterized in that the said inductor is constituted by a first coil having a first direction of winding and of at least one second coil formed of at least one turn of a direction opposite to that of the said first coil.

According to a particular characteristic of the invention, the said inductor is constituted by at least two coils providing magnetic fields equal in absolute value but opposite in phase.

The invention will be better understood by means of the following description, given only by way of example, and made in reference to the attached drawings, in which.

Figure 1:
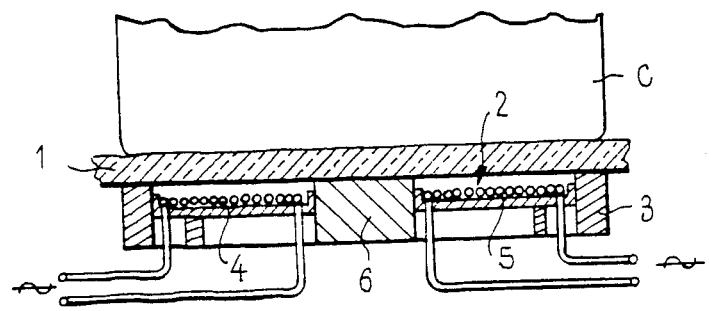
FIG. 1 is a schematic view in elevation and section of a heating appliance according to the invention.

On FIG. 1 there is shown an induction cooking plate comprising a support plate 1, for example, in vitreous ceramic, intended to support a pan C forming the armature.

Under the support 1 there is placed an inductor 2 carried by a mounting 3.

The inductor 2 in the present example is made up of two coils, 4 and 5, intended to be fed with a current of frequency between 25 and 30 KHz by a frequency convertor, not shown.

The coils 4 and 5 have the same inductance and advantageously are of semi-circular shape. They are each made up of a copper conductor formed of twisted wires wound flat, their directions of winding being opposed such that when they are fed, they produce magnetic fields equal in absolute value but opposite in phase.

Figure 5:
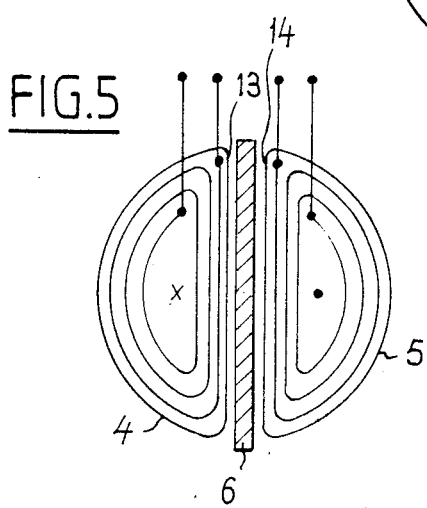
FIG. 5 is a schematic plan view of a practical way of constructing an inductor with two coils.

As clearly represented on FIG. 5, a ferrite bar 6 to isolate the coils 4 and 5 from each other, is placed between the straight sides of the two semi-circular coils 4 and 5.

Figure 2:
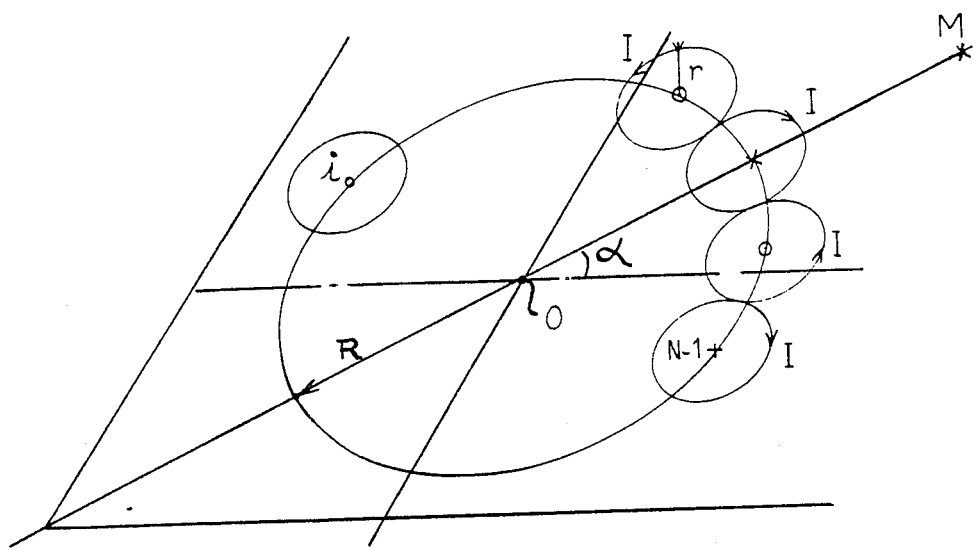
FIG. 2 is a theoretical diagram in perspective of an inductor with N elements.

With the object of a theoretical demonstration, in FIG. 2 an inductor is considered with N identical coils having the same number of turns and the same diameter, each represented by a little circle, N being an even number.

An index "i" is given to each element (iE[0, N−1])

The construction of this inductor is such that two of its adjacent coils are traversed by currents I of opposite sense, such that the field generated by a coil is in phase opposition with the field generated by its two neighbouring coils.

It is proved that the resultant field produced by the inductor at a point M situated at a distance L from the centre O of the inductor is given by the relation:

$$H_M = \frac{H_o}{M} \left[ \sum_{i=0}^{i=N-1} (-1)^i \left( L\cos\alpha - R\cos i\frac{2\pi}{N} \right)^2 + \left( L\sin\alpha - R\sin i\frac{2\pi}{N} \right)^2 \right]^{-\frac{3}{2}}$$

in which Ho is the field radiated by an "equivalent" single or unipolar inductor at a frequency of 20 KHz, and R is the radius of the circle on which are located the centres of the wound elements of the inductor. $L < 10^3$ m designates the distance from the centre of the inductor to the measurement point H.

Exploiting this relation shows that the radiation of the inductors diminishes as the number of coils of which it is constituted is increased.

Figure 3:
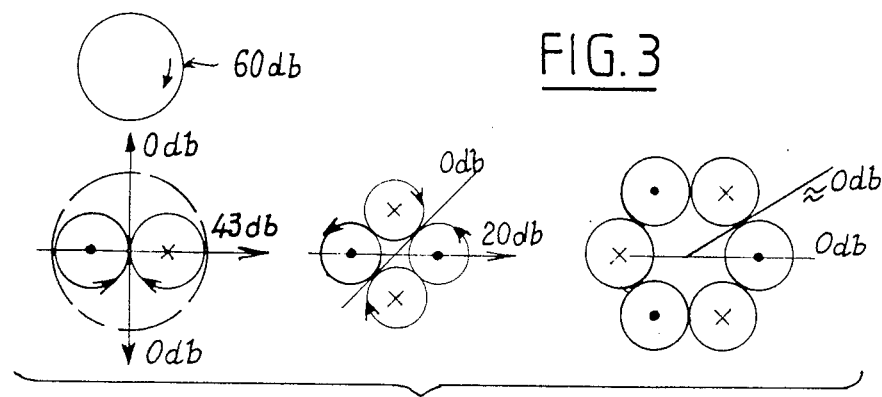
FIG. 3 shows the comparative diagrams of the radiation produced by a single inductor and by the inductors according to the invention with two, four and six coils.

On FIG. 3 it is seen that a unipolar inductor has an omnidirectional radiation of 60 db at a distance L=1 m from the centre of the inductor.

An equivalent two coil or bipolar inductor presents a radiation of 43 db along the line joining the centres of the two coils and a radiation of 0 db along a line passing between the two coils and perpendicular to the line joining their centres.

A quadripolar inductor, of which the four coils are inscribed in a circle presents a radiation of 20 db along the lines joining the centres of two diametrically opposed coils and a radiation of 0 db on a line passing between two neighbouring coils and perpendicular to the line joining their centres.

A hexapolar inductor, of which the six coils are inscribed in a circle, presents a radiation of 0 db on a line passing by the centres of two diametrically opposed coils and a radiation little different from 0 db on a line passing between two neighbouring coils.

The theoretical results stated above do not take account of the absorption and reflection of the radiation by a vessel placed on a cooking plate constructed according to the invention, but they confirm the interest in constructing an inductor by means of one or more pairs of coils arranged according to symmetrical configurations referred to the centre of this inductor.

Further, it has been shown experimentally that with an inductor with six coils or poles, the attenuation in the band of 150 to 305 KHz is 20 db for the first harmonic, the remainder being lost in the background noise.

This reduction of the level of harmonics obtained by means of an inductor with several coils or poles is obtained to the detriment of the efficiency of heating the vessel, which is 70% with a single inductor and which falls in the case of an arrangement with six coils, to a value of 50%.

However, this problem is resolved by judiciously arranging ferrite bars between the coils to canalize the lines of fields produced by the coils, said ferrite bars being intended to isolate each sector of the inductor from one coil to another. This arrangement will be described further on in referring to FIGS. 5 to 7.

It has just been shown that the use in an inductor of coils producing fields in phase opposition can lead to appreciable attenuations both of the fundamental frequency and of the harmonics radiated by the inductor.

It is possible to deduce from this that a unipolar inductor or one with a single coil can be rendered non pollutant by providing one or more counter-turns, judiciously calculated and arranged so as to compensate for the radiation of the inductor.

Figure 4:
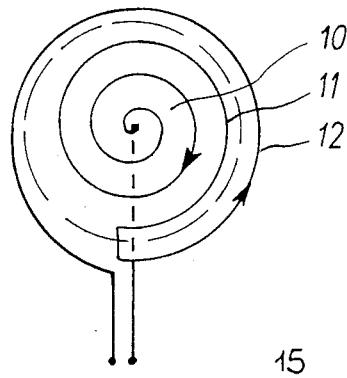
FIG. 4 is a schematic view of a modification of the inductor entering into the construction of the cooking appliance according to the invention.

Such an arrangement is represented schematically on FIG. 4, on which it is seen that the inductor includes a coil 10 wound in a spiral in a determined direction and of which the outer turn 11 is surrounded by a counter-turn 12 wound in the inverse direction. The presence of a single counter-turn enables an attenuation of the radiation of 10 db to be obtained.

It would also be possible to use several counter-turns of the type already mentioned and able to be switched as a function of the diameter of the vessel placed on the plate.

Levels of radiation would then be obtained similar to those measured for the multipolar inductors such as those represented schematically in FIG. 3.

In FIG. 5 there is represented schematically on plan a practical way of realizing the inductor with two coils entering into the construction of the cooking plate of FIG. 1.

This inductor is formed of two coils 4 and 5 each wound to follow approximately a semi-circle, their directions of winding being opposite.

These two coils have equal inductances, so that, owing to their opposite directions of winding, they produce, when they are fed by a frequency convertor, not shown, magnetic fields equal in absolute value but in phase opposition.

The coils 4 and 5 are separated by a ferrite bar 6, to canalize the lines of the field, arranged between their straight sides 13 and 14, which lie along the diameter of the cooking plate.

Figure 6:
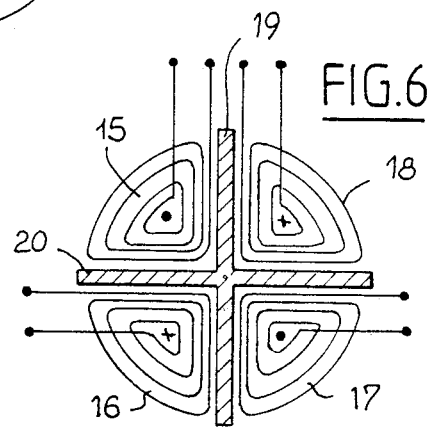
FIG. 6 is a view similar to that of FIG. 5 of an inductor with four coils.

FIG. 6 shows a quadripolar inductor formed of four coils 15 to 18, wound in the form of quarters of a circle and arranged each one in a quadrant of a circle defining the useful periphery of the inductor.

The winding directions of two adjacent coils are opposed.

The coils 15 to 18 are separated from each other by ferrite bars 19 and 20 which form a cross.

Figure 7:
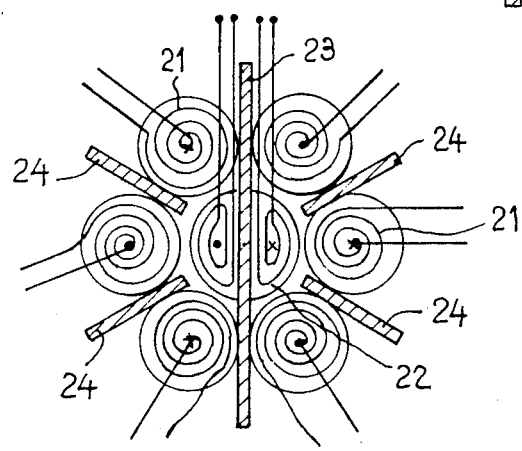
FIG. 7 is a view similar to that of FIGS. 5 and 6 of an inductor with six peripheral coils and two central coils.

The inductor represented in FIG. 7 is an inductor formed of six peripheral coils 21, of which the centres are arranged following a circumference, and of two central coils 22, wound in semi-circles similar to those of the inductor in FIG. 5.

Between these central coils 22 there is interposed a ferrite bar 23 which also ensures the separation between four peripheral coils 21.

The peripheral coils 21 next to those arranged on both sides of the ferrite bar 23 are separated from the latter by four supplementary ferrite bars 24.

The inductors which have just been described by reference to FIGS. 5 to 7 can be constructed by utilizing the techniques of multi-layer printed circuits or by means of multi-strand copper cable.

The coils of an inductor are advantageously connected in series whereby parasitic radiation loops due to the connections between the coils are limited.

We claim:

1. Induction heating assembly for an electric induction cooking appliance and comprising a support for a vessel to be heated and at least one flat inductor having a center, connectable to a current-supplying frequency converter; said inductor being constituted by a first coil, having a first winding direction, and by at least one second coil which is formed of at least one turn having a second winding direction opposite to that of said first coil and which is connected in series with said first coil; said first and second coils being of generally circular shape and being disposed in an arrangement symmetrical relative to said center of said inductor; wherein said first coil and said at least one second coil of said inductor comprise six coils of circular shape and arranged side-by-side around a circumference, two neighbouring coils having opposite winding directions, respectively; wherein said six coils arranged on the circumference constitute peripheral coils, and wherein said assembly includes, in addition, two central coils surrounded by said peripheral coils and wound in semi-circles, said central coils having opposite winding directions, respectively, and having straight sides which are opposite each other.

2. Induction heating assembly as claimed in claim 1, further comprising ferrite cores for separating said peripheral coils from each other, one of said ferrite cores further separating said central coils from each other.

* * * * *